United States Patent
Sloane et al.

(10) Patent No.: US 11,968,215 B2
(45) Date of Patent: Apr. 23, 2024

(54) DISTRIBUTED SENSOR GRID FOR INTELLIGENT PROXIMITY-BASED CLUSTERING AND AUTHENTICATION

(71) Applicant: BANK OF AMERICA CORPORATION, Charlotte, NC (US)

(72) Inventors: Brandon Sloane, Indian Land, SC (US); Richard Gar Bentley, Frisco, TX (US); Michael Ogrinz, Easton, CT (US); John Howard Kling, Cincinnati, OH (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 347 days.

(21) Appl. No.: 17/552,571

(22) Filed: Dec. 16, 2021

(65) Prior Publication Data

US 2023/0198993 A1 Jun. 22, 2023

(51) Int. Cl.
*H04L 9/40* (2022.01)
*G06F 21/30* (2013.01)
*G06F 21/31* (2013.01)
*G06F 21/32* (2013.01)

(52) U.S. Cl.
CPC ........... *H04L 63/105* (2013.01); *G06F 21/30* (2013.01); *G06F 21/31* (2013.01); *H04L 63/08* (2013.01); *H04L 63/104* (2013.01); *H04L 63/107* (2013.01); *H04L 63/1416* (2013.01); *G06F 21/32* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 5,544,322 A | 8/1996 | Cheng et al. | |
| 5,913,025 A | 6/1999 | Higley et al. | |
| 7,574,202 B1 | 8/2009 | Tsao et al. | |
| 7,724,670 B2 | 5/2010 | Nilakantan et al. | |
| 7,788,703 B2 | 8/2010 | Jou et al. | |
| 7,804,807 B2 | 9/2010 | Korus et al. | |
| 8,146,160 B2 | 3/2012 | Orr et al. | |
| 8,195,944 B2 | 6/2012 | Sherburne et al. | |
| 8,355,695 B2 | 1/2013 | Korhonen | |
| 9,191,365 B2 | 11/2015 | Orr et al. | |
| 9,882,914 B1 * | 1/2018 | Co | H04L 63/205 |
| 10,178,508 B1 * | 1/2019 | Diamanti | G06N 99/00 |
| 10,505,925 B1 * | 12/2019 | Doloff | H04L 63/101 |
| 10,509,911 B2 * | 12/2019 | Mahaffey | H04L 63/0227 |
| 10,805,175 B2 | 10/2020 | Stocker | |
| 10,951,622 B2 | 3/2021 | Heintel et al. | |

(Continued)

*Primary Examiner* — Lashonda Jacobs-Burton
(74) *Attorney, Agent, or Firm* — Moore & Van Allen PLLC; Nicholas C. Russell

(57) ABSTRACT

Embodiments of the present invention provide a system for monitoring a cybersecurity mesh network comprising a distributed sensor grid and a plurality of devices for detection of one or more security incidents. In response to determining that one of the one or more security incidents has occurred, and in response to receiving the request from an identified device that requires the first level of authentication, transmitting to the identified device a request for authentication credentials that meet a second level of authentication, wherein the second level of authentication is more strict than the first level of authentication.

20 Claims, 4 Drawing Sheets

(56) References Cited

U.S. PATENT DOCUMENTS

| | | | |
|---|---|---|---|
| 11,140,157 B1* | 10/2021 | Xia | H04L 63/0853 |
| 11,765,156 B2* | 9/2023 | Cui | H04L 63/0853 |
| | | | 726/7 |
| 11,855,989 B1* | 12/2023 | Hall | H04L 63/101 |
| 2002/0035635 A1 | 3/2002 | Holden et al. | |
| 2003/0051026 A1 | 3/2003 | Carter et al. | |
| 2003/0061506 A1 | 3/2003 | Cooper et al. | |
| 2003/0140151 A1 | 7/2003 | Daenen et al. | |
| 2004/0015719 A1 | 1/2004 | Lee et al. | |
| 2004/0123156 A1 | 6/2004 | Hammond, II et al. | |
| 2004/0193912 A1 | 9/2004 | Li et al. | |
| 2007/0206537 A1* | 9/2007 | Cam-Winget | H04W 12/06 |
| | | | 370/331 |
| 2010/0293378 A1 | 11/2010 | Xiao et al. | |
| 2011/0202466 A1* | 8/2011 | Carter | H04W 4/023 |
| | | | 705/67 |
| 2013/0174259 A1* | 7/2013 | Pearcy | H04L 63/20 |
| | | | 726/25 |
| 2017/0195339 A1* | 7/2017 | Brown | H04W 4/80 |
| 2019/0273747 A1* | 9/2019 | Hardt | H04L 63/1466 |
| 2019/0357043 A1* | 11/2019 | Hu | H04L 9/0643 |
| 2022/0329630 A1* | 10/2022 | Li | G06N 20/00 |
| 2023/0046035 A1* | 2/2023 | Nakazato | H04L 63/08 |
| 2023/0179614 A1* | 6/2023 | Sloane | H04L 63/1425 |
| | | | 726/1 |
| 2024/0037888 A1* | 2/2024 | Lester | H04N 7/183 |

* cited by examiner

DISTRIBUTED SENSOR GRID FOR INTELLIGENT PROXIMITY-BASED CLUSTERING AND AUTHENTICATION

BACKGROUND

In conventional network security systems (e.g., using a single firewall network security device), component devices are checked at an initial point of entry (i.e., the firewall), but are not consistently and continually authenticated. The use of a cybersecurity mesh network comprising a distributed sensor grid allows network nodes to perform authentication challenges and checks to identify and resolve potential abnormalities.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a distributed sensor grid for intelligent proximity-based clustering and authentication. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve monitoring a cybersecurity mesh network comprising a distributed sensor grid and a plurality of devices for detection of one or more security incidents.

In some such embodiment, the security incident comprises a detection of an affected device of the plurality of devices, wherein the affected device and the identified device are both located within a specific geographic region associated with the cybersecurity mesh network.

Additionally or alternatively, the security incident may comprise a detection of an affected device of the plurality of devices, wherein the affected device and the identified device are both directly connected to a specific computing network that is a subset network within the cybersecurity mesh network.

Furthermore, the security incident may comprise a detection of an affected device of the plurality of devices, wherein the affected device was determined to be affected within a specific period of time before the request was later received from an identified device to perform a particular action (e.g., an action that requires the first level of authentication, as described in more detail below).

In some embodiments, the distributed sensor grid and the plurality of devices of the cybersecurity mesh network may comprise network nodes that are in continuous communication to perform status checks on each other.

In some embodiments, the system determines that one of the one or more security incidents has occurred.

The system may also receive a request from an identified device to perform an action that requires a first level of authentication, wherein the identified device is one of the plurality of devices.

In response to determining that one of the one or more security incidents has occurred, and in response to receiving the request from the identified device that requires the first level of authentication, transmit to the identified device a request for authentication credentials that meet a second level of authentication, wherein the second level of authentication is more strict than the first level of authentication.

In some embodiments, the system may receive, from the identified device, an authentication response to the request for the authentication credentials for the second level of authentication.

Next, the system may compare the authentication response to a stored set of authentication credentials for the identified device for the second level of authentication.

In response to determining that the authentication response matches the stored set of authentication credentials for the second level of authentication, the system may permit the identified device to perform the action.

Alternatively, in response to determining that the authentication response does not match the stored set of authentication credentials for the second level of authentication, the system may not permit the identified device to perform the action.

In embodiments where the system does not permit the identified device to perform the action, the system may expand a geographic region associated with the security incident based on a current location of the identified device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
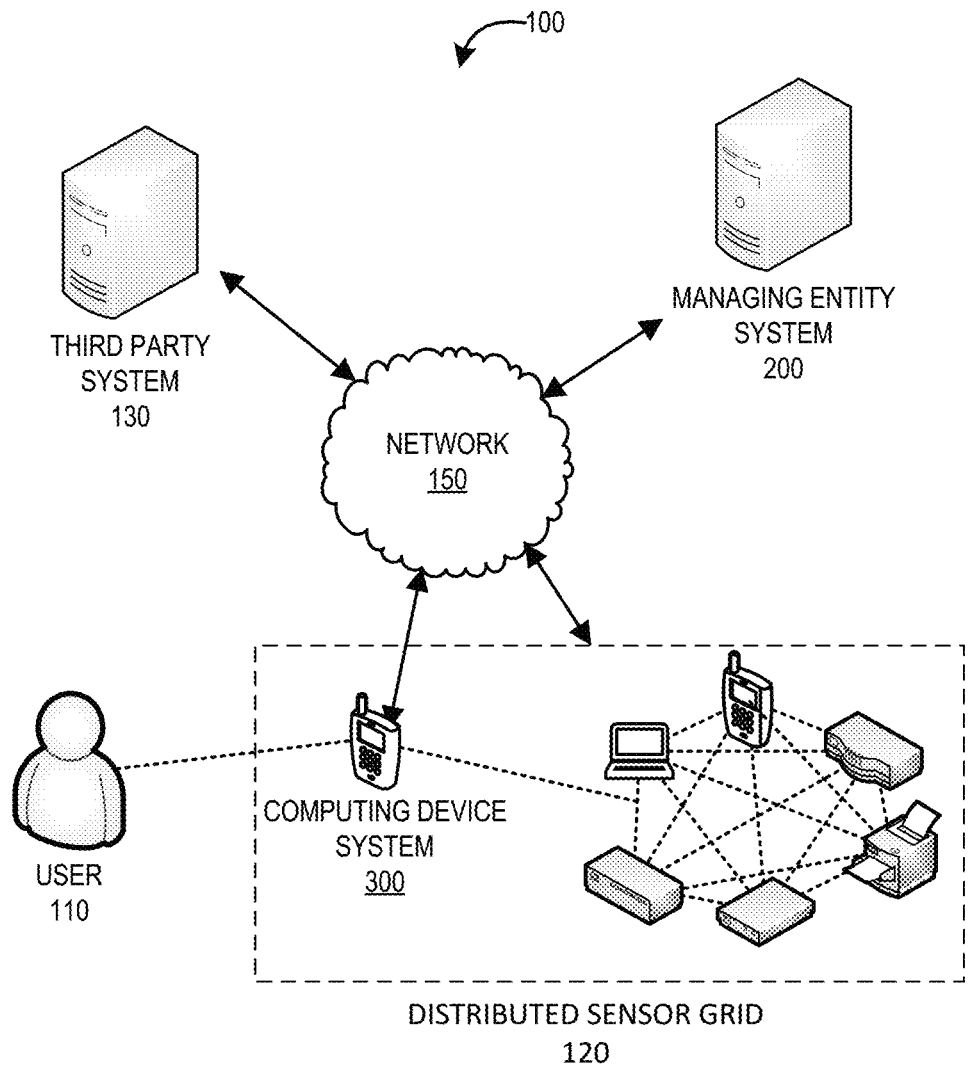
Figure 2:
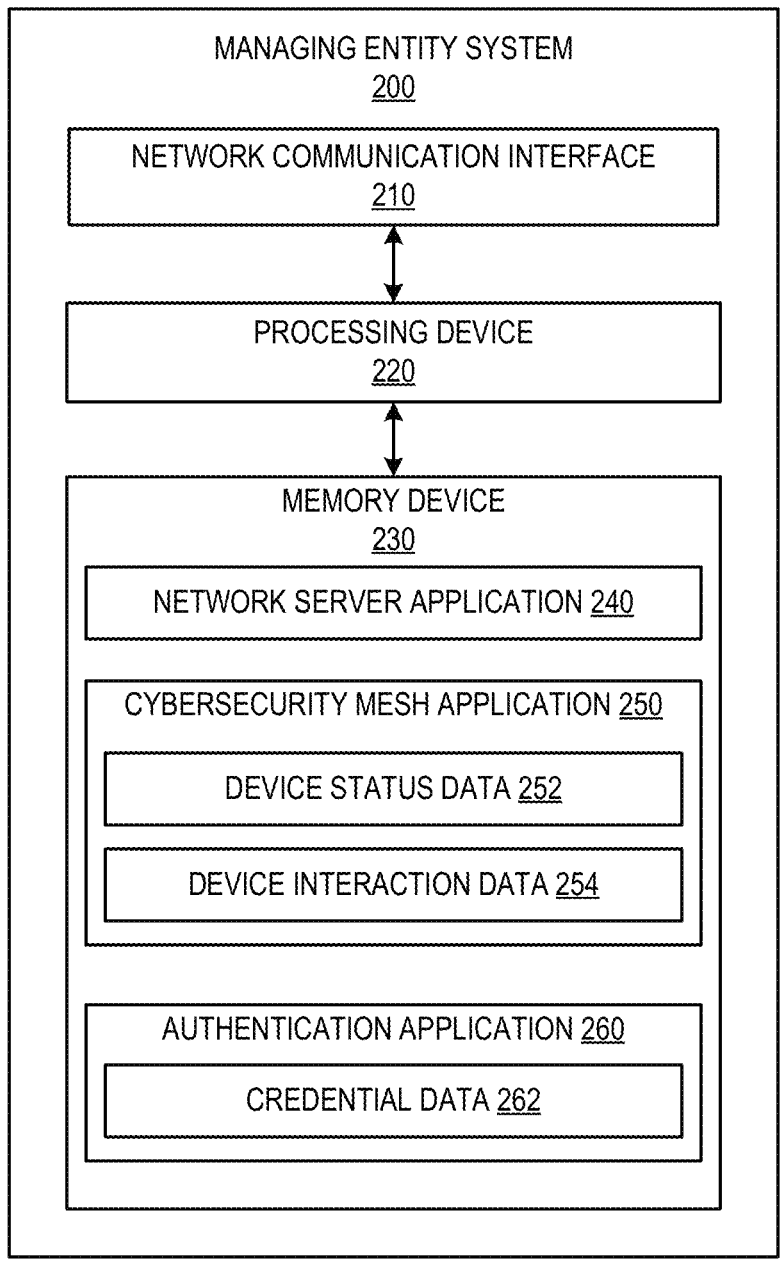
Figure 3:
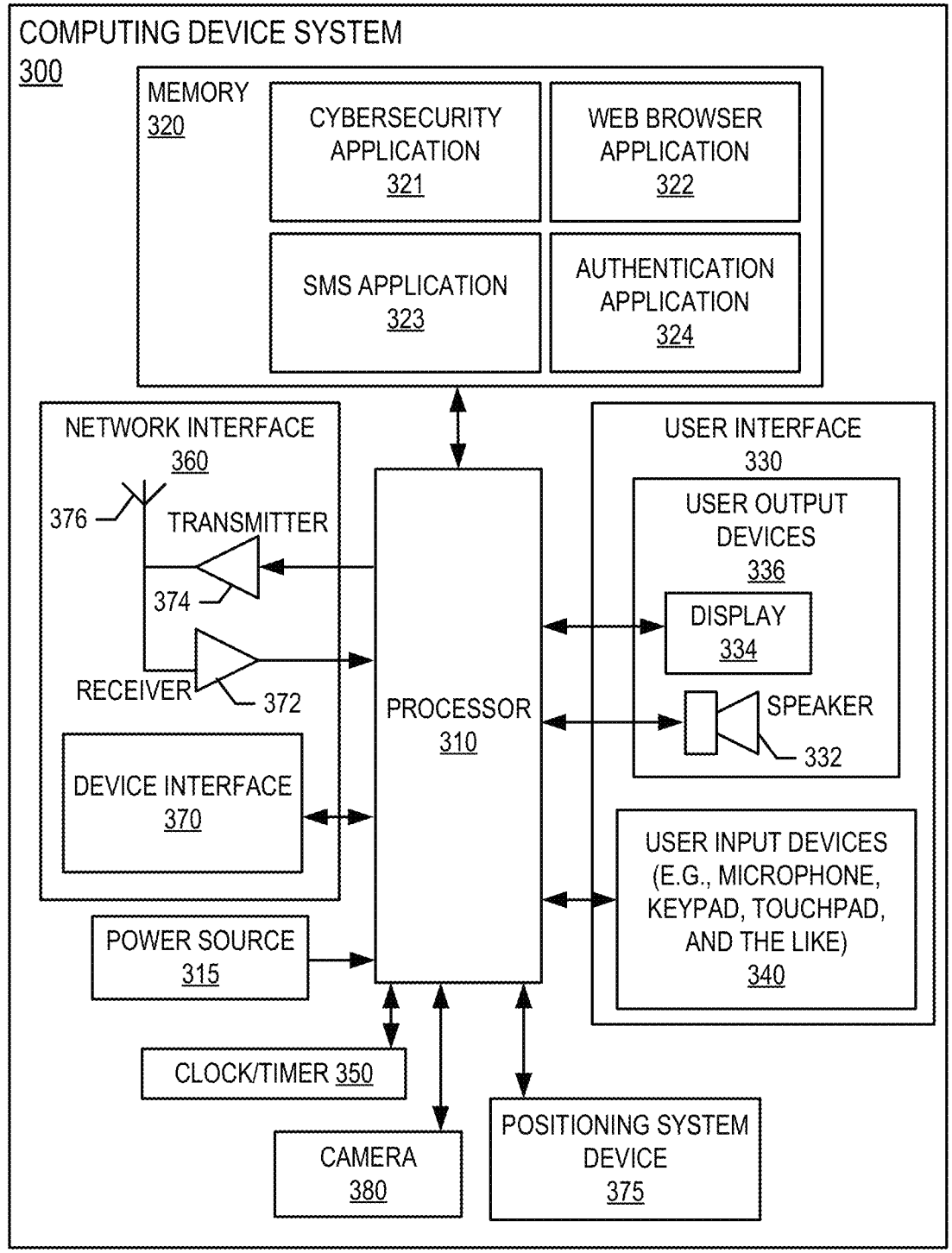
Figure 4:
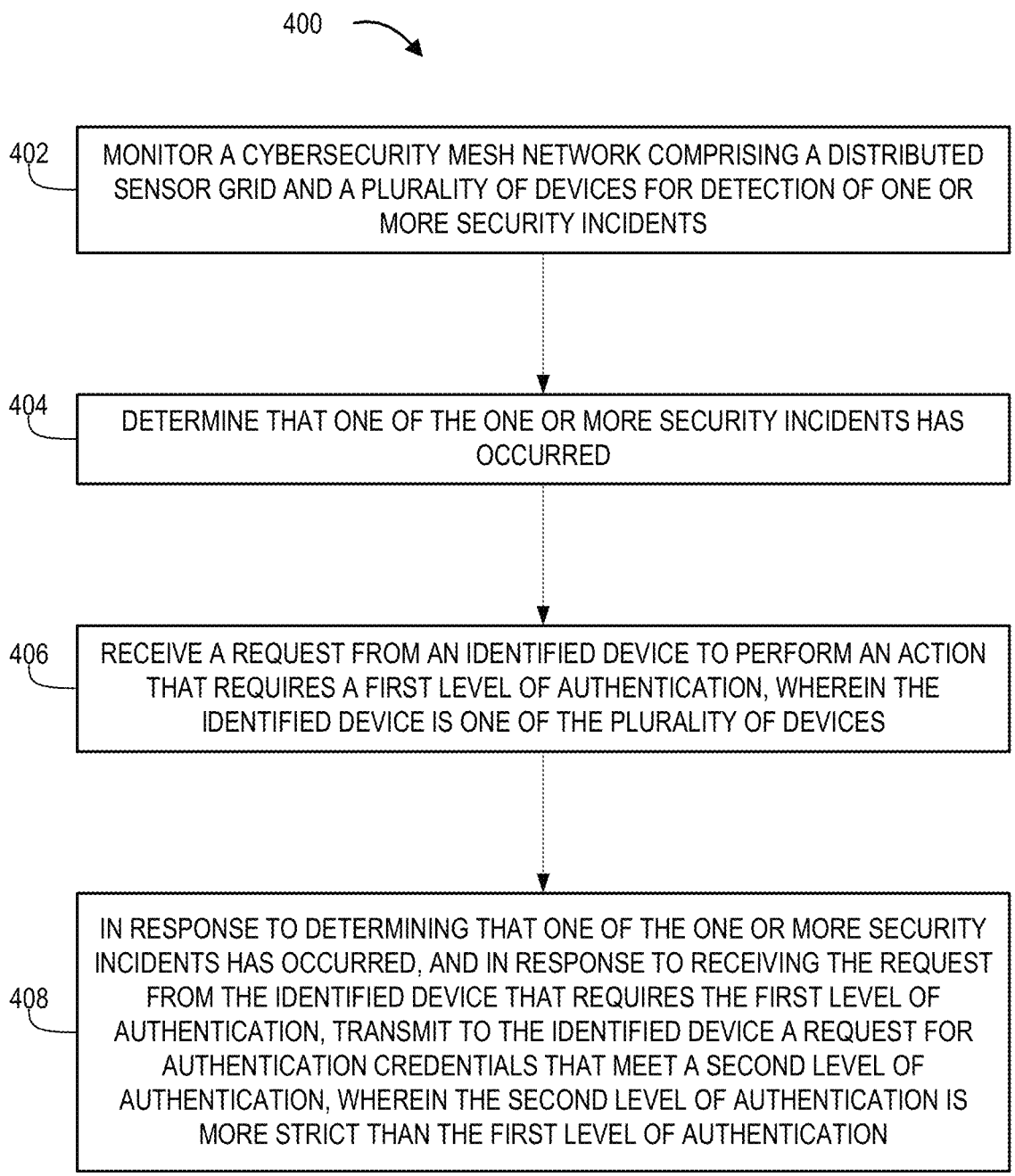

Having thus described embodiments of the invention in general terms, reference will now be made the accompanying drawings, wherein:

FIG. 1 provides a block diagram illustrating a system environment for providing a distributed sensor grid for intelligent proximity-based clustering and authentication, in accordance with an embodiment of the invention;

FIG. 2 provides a block diagram illustrating the managing entity system of FIG. 1, in accordance with an embodiment of the invention;

FIG. 3 provides a block diagram illustrating the computing device system of FIG. 1, in accordance with an embodiment of the invention;

FIG. 4 provides a flowchart illustrating a process for providing a distributed sensor grid for intelligent proximity-based clustering and authentication, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for a distributed sensor grid for intelligent proximity-based clustering and authentication. This invention addresses problems of conventional systems, where user devices do not have the benefit of sharing information for network security purposes, as would typically occur in a large entity that has control over its multiple devices across a geographic region (and can perform security measures like isolating a device or notifying users on other devices that are also controlled by that entity).

In the present invention, the concept of a neuro trust or a cybersecurity mesh can be utilized to provide an improved authentication and security service for a collection of devices, applications, and the like. The cybersecurity mesh (or neuro trust) uses the principle of never trusting, and always verifying devices in the network over time. The neuro trust system continuously uses techniques to confirm whether an individual using a device is the individual that they assert to be. The cybersecurity mesh also uses the same principle in a distributed, decentralized fashion. For any host device, instead of clearing the device as being within a perimeter of a mesh network (e.g., past a firewall), the cybersecurity measures are continuously implemented within the mesh networks, even on devices that have passed a different or earlier authentication technique. The cybersecurity measures can be implemented tightly around a specific device, including through the analysis (e.g., malware scanning) of signals being transmitted between two applications or host devices within the network.

In some embodiments, the cybersecurity mesh network is one or more of the embodiments described in more detail in the co-pending patent application entitled "SYSTEM AND METHOD FOR SELF-CLUSTERING EDGE COMPUTING PROTECTION" (U.S. application Ser. No. 17/547,566).

In the present invention, a cybersecurity mesh allows network nodes to alert nearby nodes to potential security issues and network environment anomalies. For example, a coordinated defense of user devices may be implemented. This could be implemented to prevent user devices from receiving or experiencing security incidents or schemes occurring in the same geographical area that the user device is connected to (both at a local, e.g., building or room, level and at larger geographic region area, e.g., over multiple miles, jurisdictions, or the like). Examples of these security incidents include a specific security incident in a certain geographic area, malware is detected on a specific network, or a device has been compromised in the vicinity of a customer device. When security incidents such as these occur, the affected device (and an associated user for that affected device) may be required by the system that manages the cybersecurity network to undergo a heightened level of authentication by the nature of the device and/or user being in the affected geographic area, on the specific network, or within the particular vicinity.

If a device near a user (i.e., not the user's device, but a different device that is proximal to or within a same geographic region or vicinity as the user) is deemed an "outlier," as compared to a baseline of normal device activity for the cybersecurity mesh network, then the user's device may be clustered by nature of its vicinity to the outlier device. In this way, the cybersecurity mesh network system can implement more stringent security on all devices within the cluster to resolve any authentication issues or concerns before they affect other devices in the cybersecurity mesh network.

In general, the invention allows users to leverage the data collected by a larger entity to anticipate and react to potential nearby security incidents. Users may only have access to knowledge of their particular device, whereas this system will issue notifications to users regarding incidents affecting nearby devices (including devices that may not necessarily belong to or be directly associated with the user, such as networking equipment of a public network).

FIG. 1 provides a block diagram illustrating a system and environment 100, in accordance with an embodiment of the invention. As illustrated in FIG. 1, the environment 100 includes a distributed sensor grid 120 comprising a plurality of nodes (i.e., devices, computing devices like the computing devices system 300, sensors, modems, and the like), a managing entity system 200, and a third party system 130, all in operative communication with a network 150. As shown in FIG. 1, the environment 100 may, in some embodiments, include a user 110 that owns, uses, or otherwise has access to a computing device system 300 in communication with the other devices and systems of the environment 100. The user 110 may, in some embodiments, represent a customer, employee, contractor, or the like, of the managing entity system 200, or may be otherwise affiliated with the managing entity system 200 (e.g., as a customer of a different entity that is part of a consortium with a managing entity controlling the managing entity system 200). As used herein, the term "user" shall generally mean a person or entity (e.g., a business) that interacts with the computing device system 300 to perform one or more actions with the computing device system 300 (e.g., requesting certain actions, providing authentication credentials to the managing entity system 200, providing stricter levels of authentication credentials to the managing entity system 200 in response to prompts transmitted to the computing device system 300, and the like).

The environment 100 also may include a computing device system 300 for use by the user 110. In some embodiments, a computing device system 300 may be associated with a different person or entity than the user 110. For example, the system environment 100 may include an electronic communication channel with a person or entity for whom the user 110 is conducting an authentication response, such that the managing entity system 200 may request additional information from this other person or entity. The computing device system 300 may be any device that employs a processor and memory and can perform computing functions, such as a personal computer, a mobile device, an automated teller machine (ATM), a point of transaction (POT) device, and the like. As used herein, a "mobile device" may be any mobile communication device, such as a cellular telecommunications device (i.e., a cell phone or mobile phone), personal digital assistant (PDA), a mobile Internet accessing device, or other mobile device.

The computing device system 300 and other nodes of the distributed sensor grid 120 are configured to communicate over a network 150 with a managing entity system 300 and one or more third party systems 130. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network.

The distributed sensor grid 120 may comprise a plurality of nodes (e.g., devices or sensors) in constant or periodic communication with each other. The managing entity system may manage and monitor these nodes of the distributed sensor grid 120 by implementing, managing, and monitoring a cybersecurity mesh network across the nodes that performs checks, tests, and other security incident identification techniques, and also performs enhanced authentication steps for verifying and validating individual nodes of the distributed sensor grid 120.

Mesh frameworks like the cybersecurity mesh network allow for multiple nodes or devices in a networking environment to apply security measures and take certain actions at individual nodes within the network, as opposed to a single point of control (e.g., a network firewall, which only protects from an initial access point). There is a need to apply this framework in a network security context as opposed to using a conventional, single point of entry firewall-type security or authentication analysis. The present invention may be utilized to analyze traffic patterns (e.g., data transmissions, application requests, geographic location information, time-based action information, authentication credentials, and the like) on each of the computing devices of the nodes and tailor device-specific security measures in response and, if necessary, broadcast such measures to adjacent or geographically neighboring nodes.

The managing entity system 200 implements its cybersecurity mesh network traffic analysis at a node device, so while data and information may be aggregated across all nodes of the distributed sensor grid in a centralized manner to identify potential security incidents, rules (e.g., enhanced authentication requirements) may be applied at specific outlier nodes with traffic information that differs from other nodes. Overlapping data patterns may be used to identify the degree of similarity between nodes or devices. Data from each node may be used to gather a larger picture of total network traffic information, and a collection of nodes may be programmed to act in concert with one another. For instance, similarities between nodes may lead to the nodes self-clustering as measured based on a similarity index calculation (i.e., multiple nodes may be considered by the managing entity system 200 implementing the cybersecurity mesh network as a single node for purposes of security incident analysis and authentication requirements. Clustered nodes may act in concert to enhance the overall security of the network.

The managing entity system 200 is in network communication with other devices, such as the distributed sensor grid 120 (including a computing device system 300 of the user 110) and one or more third party systems 130 via the network 150 to implement a cybersecurity mesh network for protecting devices and information across the distributed sensor grid through the use of enhanced authentication techniques. In one embodiment, the invention may provide an application download server such that software applications that support the managing entity system 200 can be downloaded to the computing device system 300 and/or other devices in the distributed sensor grid 120. The managing entity system 200 is described in more detail in FIG. 2.

In general, a computing device system 300 is configured to connect with the network 150 to interface the user 110 or a different person with an application of the managing entity system 200, other nodes of the distributed sensor grid 120, and/or one or more third party systems 130. A user 110, in order to perform actions with the computing devices system 300 (particularly within the distributed sensor grid 120 encompassing a cybersecurity mesh network established by the managing entity system 200), must authenticate with the managing entity system 300 and/or another system (e.g., a third party authentication platform that would be represented by the third party system 130). For example, requesting to transmit information or data between the computing device system 300 and a different device of the distributed sensor grid 120 generally requires that the user 110 authenticate an identity using a user name, a passcode, a cookie, a biometric identifier, a private key, a token, answers to challenge questions, and/or another authentication mechanism that is provided by the user 110 to the managing entity system 300 via the computing device system 300. The computing device system 300 is described in more detail in FIG. 3.

In some embodiments of the invention, one or more of the nodes (i.e., devices, sensors, and the like, including the computing device system 300) within the distributed sensor grid 120 are configured to be controlled and managed by one or more third-party providers (not shown), users, financial institutions or other entities over the network 150. In other embodiments, one or more of the nodes (i.e., devices, sensors, and the like, including the computing device system 300) within the distributed sensor grid 120 are configured to be controlled and managed over the network 150 by the same entity that maintains the managing entity system 300 (e.g., a "managing entity").

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a cybersecurity mesh application 250 which includes device status data 252 and device interaction data 254, an authentication application 260 which includes credential data 262, and other computer-executable instructions or other data. The computer-executable program code of the network server application 240, the cybersecurity mesh application 250, and/or the authentication application 260 may instruct the processing device 220 to perform certain logic, data-processing, and data-storing functions of the managing entity system 200 described herein, as well as communication functions of the managing entity system 200.

In one embodiment, the cybersecurity mesh application 250 includes device status data 252 and device interaction data 254. The device status data 252 may comprise certain information collected for each node of the distributed sensor grid 120 that indicates whether the device is online, operating in a normal manner, and in an identified location. Device status data 252 may be collected from automatic, continuous or periodic transmissions from each device (e.g., periodic transmissions from a device that indicate nominal performance of a device), or may be actively acquired by the managing entity system (e.g., pings from a device of the managing entity system to a device of the distributed sensor grid 120 to obtain information regarding response time, online availability, current processing levels, and the like). Examples of device status data 252 include Internet Protocol address, device availability information, on/off information, current amount of data being processed by a device, and the like, all collected over time for data trend analysis.

The device interaction data 254 may comprise information received from a computing device of the distributed sensor grid 120 that represent requests for that device to perform certain actions, to open or instruct applications of other devices on the network 150 (including within the distributed sensor grid 120) to perform certain actions, and the like. These actions may be requests to transmit information (e.g., user information, transaction information, authentication credentials, and the like).

The authentication application 260 may be configured to implement authentication checks, tests, and other similar security measures across the distributed network grid, as a component of the cybersecurity mesh network for the protection of devices in the distributed sensor grid 120. The authentication application 260 may be configured to identify a user associated with a particular device in the distributed sensor grid 120, identify the authentication credential information associated with that user, transmit an authentication requests to that user, and check an authentication credential response with that user against the identified authentication credentials for the user. All such information associated with implementing the authentication checks may be stored as credential data 262 within the authentication application 260 of the managing entity system 200.

The network server application 240, the cybersecurity mesh application 250, and the authentication application 260 are configured to invoke or use the device status data 252, the device interaction data 254, the credential data 262, and the like when communicating through the network communication interface 210 with devices of the distributed sensor grid 120 and/or one or more third party systems 130.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the devices of the distributed sensor grid 120, third party systems 130, and the like. The processing device 220 is configured to use the network communication interface 210 to transmit and/or receive data and/or commands to and/or from the other devices connected to the network 150.

FIG. 3 provides a block diagram illustrating a computing device system 300 of FIG. 1 in more detail, in accordance with embodiments of the invention. In one embodiment of the invention, the computing device system 300 is a mobile telephone. However, it should be understood that a mobile telephone is merely illustrative of one type of computing device system 300 that may benefit from, employ, or otherwise be involved with embodiments of the present invention and, therefore, should not be taken to limit the scope of embodiments of the present invention. Other types of computing devices 300 may include portable digital assistants (PDAs), pagers, mobile televisions, laptop computers, cameras, video recorders, audio/video player, radio, GPS devices, or any combination of the aforementioned.

Some embodiments of the computing device system 300 include a processor 310 communicably coupled to such devices as a memory 320, a user interface 330 comprising user output devices 336 and/or user input devices 340, a network interface 360, a power source 315, a clock or other timer 350, a camera 380, and a positioning system device 375. The processor 310, and other processors described herein, generally include circuitry for implementing communication and/or logic functions of the computing device system 300. For example, the processor 310 may include a digital signal processor device, a microprocessor device, and various analog to digital converters, digital to analog converters, and/or other support circuits. Control and signal processing functions of the computing device system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the computing device system 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless network 152. In this regard, the computing device system 300 may be configured to operate with one or more air interface standards, communication protocols, modulation types, and access types. By way of illustration, the computing device system 300 may be configured to operate in accordance with any of a number of first, second, third, and/or fourth-generation communication protocols and/or the like. For example, the computing device system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The computing device system 300 may also be configured to operate in accordance with non-cellular communication mechanisms, such as via a wireless local area network (WLAN) or other communication/data networks.

As described above, the computing device system 300 has a user interface 330 that is, like other user interfaces described herein, made up of user output devices 336 and/or user input devices 340. The user output devices 336 include a display 330 (e.g., a liquid crystal display or the like) and a speaker 332 or other audio device, which are operatively coupled to the processor 310.

As used herein, a "user interface" 330 generally includes a plurality of interface devices and/or software that allow a customer (e.g., the user 110) to input commands and data to direct the processing device to execute instructions. For example, the user interface 330 presented in FIG. 3 may include a graphical user interface (GUI) or an interface to input computer-executable instructions that direct the processor 310 to carry out specific functions. The user interface 330 employs certain input and output devices to input data received from the user 110 or output data to the user 110. These input and output devices may include a display, mouse, keyboard, button, touchpad, touch screen, microphone, speaker, LED, light, joystick, switch, buzzer, bell, and/or other customer input/output device for communicating with one or more customers.

The user input devices 340, which allow the computing device system 300 to receive data from a user such as the user 110, may include any of a number of devices allowing the computing device system 300 to receive data from the user 110, such as a keypad, keyboard, touch-screen, touchpad, microphone, mouse, joystick, other pointer device, button, soft key, and/or other input device(s). The user interface may also include a camera 380, such as a digital camera.

The computing device system 300 may also include a positioning system device 375 that is configured to be used by a positioning system to determine a location of the computing device system 300. For example, the positioning system device 375 may include a GPS transceiver. In some embodiments, the positioning system device 375 is at least partially made up of the antenna 376, transmitter 374, and receiver 372 described above. For example, in one embodiment, triangulation of cellular signals may be used to identify the approximate or exact geographical location of the computing device system 300. In other embodiments, the positioning system device 375 includes a proximity sensor or transmitter, such as an RFID tag, that can sense or be sensed by devices known to be located proximate a merchant or other location to determine that the computing device system 300 is located proximate these known devices.

The computing device system 300 further includes a power source 315, such as a battery, for powering various circuits and other devices that are used to operate the computing device system 300. Embodiments of the computing device system 300 may also include a clock or other timer 350 configured to determine and, in some cases, communicate actual or relative time to the processor 310 or one or more other devices.

The computing device system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the computing device system 300 and/or one or more of the process/method steps described herein. For example, the memory 320 may include such applications as a cybersecurity application 321, a conventional web browser application 322, an SMS application 323, and/or an authentication application 324 (or any other application provided by the managing entity system 200). These applications also typically instructions to a graphical user interface (GUI) on the display 330 that allows the user 110 to interact with the computing device system 300, the managing entity system 200, and/or other devices or systems. In one embodiment of the invention, when the user 110 decides to enroll in a cybersecurity application 321 program, the user 110 downloads, is assigned, or otherwise obtains the cybersecurity application 321 from the managing entity system 200, or from a distinct application server (e.g., from the managing entity system 200). In other embodiments of the invention, the user 110 interacts with the managing entity system 200 or the resource accumulation system 400 via the web browser application 322 in addition to, or instead of, the cybersecurity application 321. That said, it should be known that certain cybersecurity and authentication measures described herein may be implemented by the managing entity device to the computing device system 300 via one or more of the cybersecurity application 321, the web browser application 322, the SMS application 323, and/or the authentication application 324. Each of these applications can cause the computing device system 300 to perform any of the actions described herein as being performed by the computing device system 300, including the transmission of information (e.g., requests to perform actions, action information, authentication credential information, information associated with a current user, location information, time-based information, and the like) to the managing entity system 200 and/or other devices within the distributed sensor grid 120.

The memory 320 of the computing device system 300 may comprise a Short Message Service (SMS) application 323 configured to send, receive, and store data, information, communications, alerts, and the like via the wireless telephone network 152.

The memory 320 may also include a cybersecurity application 321 configured to implement one of more steps for the identification of security incidents as part of a larger cybersecurity mesh network implemented, monitored, and otherwise managed by a managing entity (e.g., and entity controlling the managing entity system 200). Similarly, the memory 320 may include an authentication application 324 configured to implement one or more steps for the authentication of a current user of the computing device system 300. This authentication application 324 may be configured to receive authentication requests from a managing entity system 200 (e.g., via the network interface 360), display the request for a current user to provide authentication credentials on the display 334, receive an authentication credential response from the user via the user input devices 340, and transmit the authentication credential response back to the managing entity system 200 (e.g., via the network interface 360).

The memory 320 can also store any of a number of pieces of information, and data, used by the computing device system 300 and the applications and devices that make up the computing device system 300 or are in communication with the computing device system 300 to implement the functions of the computing device system 300 and/or the other systems described herein. For example, the memory 320 may include such data as device status data, device interaction data (e.g., information regarding requests made to or received from other devices of the distributed sensor grid 120), and the like.

Referring now to FIG. 4, a flowchart is provided to illustrate one embodiment of a process 400 for providing a distributed sensor grid for intelligent proximity-based clustering and authentication, in accordance with embodiments of the invention. In some embodiments, the process 400 may include block 402, where the system monitors a cybersecurity mesh network comprising a distributed sensor grid and a plurality of devices for detection of one or more security incidents.

As used herein, the term "security incident" may be any security issue, malfeasance, inappropriate or unauthorized access or use of a device, over-load of processing requests or actions for a device, power issues for a device, unapproved application locks or restrictions on a device, or any of the incident that may indicate that the device is being controlled by an unauthorized individual, is being used in an unauthorized or unapproved manner, or is being impacted in a manner that affects the device's processing or communication abilities. In such an embodiment, the system is determining that a device (i.e., the affected device) is associated with a security incident.

The distributed sensor grid and the plurality of devices of the cybersecurity mesh network, as referenced in block 402, may comprise network nodes that are in continuous communication to perform status checks on each other. As used herein, the term "node" can represent a computing device (including personal computing devices, wireless computing devices, wired computing devices, work stations, and the like), a sensor with processing and/or communication powers to provide information to other nodes in the distributed sensor grid, communication devices (e.g., wireless modems, wired modems, wireless network extenders, and the like), or other devices that can communicate with others to provide status, application, authentication, security, and other information.

The system may perform network data analysis processes, in accordance with some embodiments of the invention, to continuously check the status of each node (e.g., on/off, response time, amount of data currently being analyzed by a particular node, identification of new nodes in the system (e.g., with access to, or a new component of, the distributed sensor grid), and the like. The system may use a node analysis engine, such as a machine learning engine, to perform the cybersecurity mesh network analysis across the nodes. In this way, the system may be configured to continuously monitor, using the node analysis engine, the status of the devices within the distributed sensor grid network, including whether any of the devices have incurred, or are experiencing, security incidents.

In one example, a node may detect that an unknown device is attempting access and has failed its authentication requirement a number of times (e.g., two consecutive failures, or the like). In response, the node, which otherwise requires only a single factor authentication may dynamically change its authorization requirement to two-factor authentication. In another example, a node may detect that a person in an authorized session is downloading an unusually large amount of data, and may flag the device of that node as currently experiencing a security incident.

A machine learning model may refer to a mathematical model generated by machine learning algorithms based on sample data, known as training data, to make predictions or decisions without being explicitly programmed to do so. Using the machine learning model, the system may be configured to identify security incidents of specific nodes within the distributed sensor grid network. To generate the machine learning model capable of making such determinations, the machine learning model may be trained using previously-detected security incidents and current trends or other known or expected challenges as input to the machine learning system through historical databases, active current databases associated with separate distributed sensor grid networks, input from security experts, and the like. Accordingly, the system may be configured to retrieve, from a data repository, changes detected to the distributed sensor grid network associated with one or more security incidents.

In some embodiments, the security incident comprises a detection of an affected device of the plurality of devices, wherein the affected device and a later-identified device (e.g., a user device) are both located within a specific geographic region associated with the cybersecurity mesh network. In this manner, the system can perform steps to notify an identified device (or the user associated with or otherwise controlling the identified device) of a security incident in a common geographic region as the identified device, and/or perform heightened authentication procedures to better protect the identified device, the associated user, and the overall distributed sensor grid network.

For example, if the system determines that a first device (i.e., the affected device) is associated with a security incident like an attempt to perform an unauthorized transaction as a specific merchant location, the system may monitor other devices in a same geographic region defined by the merchant location (e.g., within a certain number of meters or kilometers from the merchant location) to identify other devices within the distributed sensor grid that may be in that geographic region. Because at least one security incident is determined to have occurred in that area, the system can perform stricter authentication checks on the other devices in the geographic region when those devices attempt to perform actions.

Additionally or alternatively, the security incident may comprise a detection of an affected device of the plurality of devices, wherein the affected device and a later-identified device (e.g., a user device) are both directly connected to a specific computing network that is a subset network within the cybersecurity mesh network. In this manner, the system can perform steps to notify an identified device (or the user associated with or otherwise controlling the identified device) of a security incident that another device that is connected to the identified device or is communicating directly with one or more other devices within the distributed sensor grid as the identified device. The system can also perform heightened authentication procedures to better protect the identified device, the associated user, and the overall distributed sensor grid network based on this determination.

For example, if the system determines that a first device (i.e., the affected device) is associated with a security incident like an attempt to perform an unauthorized transaction on a particular processing device, the system may monitor other devices that communicate directly (or indirectly, through one, two, or a few relaying steps) with that particular processing device, regardless of the geographic region(s) of the affected device, the particular processing device, and/or the identified device (e.g., a user device). Because at least one security incident is determined to have occurred in relation to the particular processing device, the system can perform stricter authentication checks on the other devices in the geographic region when those devices attempt to perform actions in relation to (or through) the particular processing device.

Furthermore, the security incident may comprise a detection of an affected device of the plurality of devices, wherein the affected device was determined to be affected within a specific period of time before the request was later received from an identified device to perform a particular action (e.g., an action that requires the first level of authentication, as described in more detail below). This time-based step can be integrated with the geographical analysis and/or the subset of the cybersecurity mesh network analysis to better protect the devices that make up the distributed sensor grid being managed by the overall cybersecurity mesh network. If a security incident has occurred in close time-proximity to a subsequent request being made within the same geographic region, subset of the cybersecurity mesh network, or on the cybersecurity mesh network overall, then the system can require such subsequent requests (e.g., by an identified device, a user device, or the like) to pass a heightened authentication credential test. For example, if the system determines that a security incident has occurred within the cybersecurity mesh network comprising a distributed sensor grid, then the system may require all transactions between the devices of the distributed sensor grid to pass a higher level of authentication for a specific period of time (e.g., for one minute after the security incident occurred, for thirty minutes after the security incident occurred, for one day after the security incident occurred, for one week after the security incident occurred, and the like).

In some embodiments, the process 400 includes block 404, where the system determines that one of the one or more security incidents has occurred. For example, the system may determine, through its machine learning engine, that a particular pattern or circumstance associated with one or more of the nodes in the distributed sensor grid network is occurring, where such pattern or occurrence is associated with a particular security incident.

The system can determine the time such security incident occurred, the time it was detected, a geographic region associated with the security incident, one or more devices associated with the security incident, one or more users, merchants, or other entities associated with the security incident, one or more device applications associated with the security incident, and the like. In some embodiments, the system may determine a magnitude of the security incident. The magnitude may be based on a scale, a predetermined set of magnitude levels, or the like. In some embodiments, the magnitude of the security incident can affect the size of a geographic area that is or will be associated with the security incident (i.e., a more impactful magnitude aligns with a larger geographic area associated with the security incident). Additionally or alternatively, the magnitude of the security incident can affect a time period during which the system may perform additional or heightened authentication checks for other devices attempting to perform actions in the cybersecurity mesh network comprising distributed sensor grids.

Additionally, in some embodiments, the process 400 includes block 406, where the system receives a request from an identified device to perform an action that requires a first level of authentication, wherein the identified device is one of the plurality of devices. The request to perform an action may be any action that a device can perform within a distributed network, including, but not limited to, transaction requests, data transfer requests, application access requests, database access requests, virtual private network access requests, wireless network access requests, and the like.

Finally, the process 400 may continue to block 408, where, in response to determining that one of the one or more security incidents has occurred, and in response to receiving the request from the identified device (e.g., a user device) that requires the first level of authentication, the system transmits to the identified device a request for authentication credentials that meet a second level of authentication, wherein the second level of authentication is more strict than the first level of authentication.

Because the system has determined that a security incident has occurred (or is occurring) within the same distributed sensor grid network as the identified device (e.g., a user device), the system can perform these additional or heightened authentication tests to better protect the identified device as well as to protect against security incidents spreading across the cybersecurity mesh network comprising the distributed sensor grid and the plurality of devices.

A first level of authentication may be a single step authentication (e.g., username and password; a pre-authorization that typically is not refreshed every instance of the requested action, a standard authentication challenge, or the like). The second level of authentication is more strict than the first level, and may include additional and/or heightened authentication credentials. For example, a second level of authentication may include multiple authentication challenges (e.g., username, password, and a challenge question), biometric authentication, two-factor authentication, and/or the like.

In some embodiments, the process 400 may continue with the step of receiving, from the identified device, an authentication response to the request for the authentication credentials for the second level of authentication. Next, the system may compare the authentication response to a stored set of authentication credentials for the identified device for the second level of authentication. In response to determining that the authentication response matches the stored set of authentication credentials for the second level of authentication, the system may permit the identified device to perform the action. In this manner, the system has performed heighted authentication checks on a device to better protect that device and the cybersecurity mesh network as a whole from any further compromise due to the detected security incident.

Alternatively, in response to determining that the authentication response does not match the stored set of authentication credentials for the second level of authentication, the system may not permit the identified device to perform the action. In this manner, the system can restrict the identified device from being further compromised or from further compromising the cybersecurity mesh network as a whole.

In embodiments where the system does not permit the identified device to perform the action, the system may expand a geographic region associated with the security incident based on a current location of the identified device. In this way, the system can cast a wider net to better protect the cybersecurity mesh network from further compromise. Additionally or alternatively, the system can expand a period of time associated with the security incident and subsequent heightened authentication based on the identified device not providing approved authentication credentials for the second level of authentication.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing a distributed sensor grid for intelligent proximity-based clustering and authentication, the system comprising:
   a memory device; and
   processing device operatively coupled to the memory device, wherein the processing device is configured to execute computer-readable program code to:
   monitor a cybersecurity mesh network comprising a distributed sensor grid and a plurality of devices for detection of or more security incidents;
   determine that one of the one or more security incidents has occurred;
   receive a request from an identified device to perform an action that requires a first level of authentication, wherein the identified device is one of the plurality of devices; and
   in response to determining that one of the one or more security incidents has occurred, and in response to receiving the request from the identified device that requires the first level of authentication, transmit to the identified device a request for authentication credentials that meet a second level of authentication, wherein the second level of authentication is more strict than the first level of authentication.

2. The system of claim 1, wherein the security incident comprises a detection of an affected device of the plurality of devices, wherein the affected device and the identified device are both located within a specific geographic region associated with the cybersecurity mesh network.

3. The system of claim 1, wherein the security incident comprises a detection of an affected device of the plurality of devices, wherein the affected device and the identified device are both directly connected to a specific computing network that is a subset network within the cybersecurity mesh network.

4. The system of claim 1, wherein the security incident comprises a detection of an affected device of the plurality of devices, wherein the affected device was determined to be affected within a specific period of time before the request was received from the identified device to perform the action that requires the first level of authentication.

5. The system of claim 1, wherein the distributed sensor grid and the plurality of devices of the cybersecurity mesh network are network nodes that are in continuous communication to perform status checks on each other.

6. The system of claim 1, wherein the processing device is further configured to execute the computer-readable program code to:
   receive, from the identified device, an authentication response to the request for the authentication credentials for the second level of authentication;
   compare the authentication response to a stored set of authentication credentials for the identified device for the second level of authentication; and
   in response to determining that the authentication response matches the stored set of authentication credentials for the second level of authentication, permit the identified device to perform the action; or
   in response to determining that the authentication response does not match the stored set of authentication credentials for the second level of authentication, do not permit the identified device to perform the action.

7. The system of claim 6, wherein, in response to determining that the authentication response does not match the stored set of authentication credentials for the second level of authentication, expand a geographic region associated with the security incident based on a current location of the identified device.

8. A computer program product for providing a distributed sensor grid for intelligent proximity-based clustering and authentication, the computer program product comprising at least one non-transitory computer readable medium comprising computer readable instructions, the instructions comprising instructions for:
   monitor a cybersecurity mesh network comprising a distributed sensor grid and a plurality of devices for detection of or more security incidents;
   determine that one of the one or more security incidents has occurred;
   receive a request from an identified device to perform an action that requires a first level of authentication, wherein the identified device is one of the plurality of devices; and
   in response to determining that one of the one or more security incidents has occurred, and in response to receiving the request from the identified device that requires the first level of authentication, transmit to the identified device a request for authentication credentials that meet a second level of authentication, wherein the second level of authentication is more strict than the first level of authentication.

9. The computer program product of claim 8, wherein the security incident comprises a detection of an affected device of the plurality of devices, wherein the affected device and the identified device are both located within a specific geographic region associated with the cybersecurity mesh network.

10. The computer program product of claim 8, wherein the security incident comprises a detection of an affected device of the plurality of devices, wherein the affected device and the identified device are both directly connected to a specific computing network that is a subset network within the cybersecurity mesh network.

11. The computer program product of claim 8, wherein the security incident comprises a detection of an affected device of the plurality of devices, wherein the affected device was determined to be affected within a specific period of time before the request was received from the identified device to perform the action that requires the first level of authentication.

12. The computer program product of claim 8, wherein the distributed sensor grid and the plurality of devices of the cybersecurity mesh network are network nodes that are in continuous communication to perform status checks on each other.

13. The computer program product of claim 8, wherein the computer readable instructions further comprise instructions for:
   receive, from the identified device, an authentication response to the request for the authentication credentials for the second level of authentication;
   compare the authentication response to a stored set of authentication credentials for the identified device for the second level of authentication; and in response to determining that the authentication response matches the stored set of authentication credentials for the second level of authentication, permit the identified device to perform the action; or in response to determining that the authentication response does not match the stored set of authentication credentials for the second level of authentication, do not permit the identified device to perform the action.

14. The computer program product of claim 13, wherein, in response to determining that the authentication response does not match the stored set of authentication credentials for the second level of authentication, expand a geographic region associated with the security incident based on a current location of the identified device.

15. A computer implemented method for providing a distributed sensor grid for intelligent proximity-based clustering and authentication, said computer implemented method comprising:

providing a computing system comprising a computer processing device and a non-transitory computer readable medium, where the non-transitory computer readable medium comprises configured computer program instruction code, such that when said instruction code is operated by said computer processing device, said computer processing device performs the following operations:

monitor a cybersecurity mesh network comprising a distributed sensor grid and a plurality of devices for detection of or more security incidents;

determine that one of the one or more security incidents has occurred;

receive a request from an identified device to perform an action that requires a first level of authentication, wherein the identified device is one of the plurality of devices; and in response to determining that one of the one or more security incidents has occurred, and in response to receiving the request from the identified device that requires the first level of authentication, transmit to the identified device a request for authentication credentials that meet a second level of authentication, wherein the second level of authentication is more strict than the first level of authentication.

16. The computer implemented method of claim 15, wherein the security incident comprises a detection of an affected device of the plurality of devices, wherein the affected device and the identified device are both located within a specific geographic region associated with the cybersecurity mesh network.

17. The computer implemented method of claim 15, wherein the security incident comprises a detection of an affected device of the plurality of devices, wherein the affected device and the identified device are both directly connected to a specific computing network that is a subset network within the cybersecurity mesh network.

18. The computer implemented method of claim 15, wherein the security incident comprises a detection of an affected device of the plurality of devices, wherein the affected device was determined to be affected within a specific period of time before the request was received from the identified device to perform the action that requires the first level of authentication.

19. The computer implemented method of claim 15, wherein the distributed sensor grid and the plurality of devices of the cybersecurity mesh network are network nodes that are in continuous communication to perform status checks on each other.

20. The computer implemented method of claim 15, wherein said computer processing device further performs the following operations:

receive, from the identified device, an authentication response to the request for the authentication credentials for the second level of authentication;

compare the authentication response to a stored set of authentication credentials for the identified device for the second level of authentication; and in response to determining that the authentication response matches the stored set of authentication credentials for the second level of authentication, permit the identified device to perform the action; or in response to determining that the authentication response does not match the stored set of authentication credentials for the second level of authentication, (i) do not permit the identified device to perform the action, and (ii) expand a geographic region associated with the security incident based on a current location of the identified device.

* * * * *